Patented Sept. 2, 1941

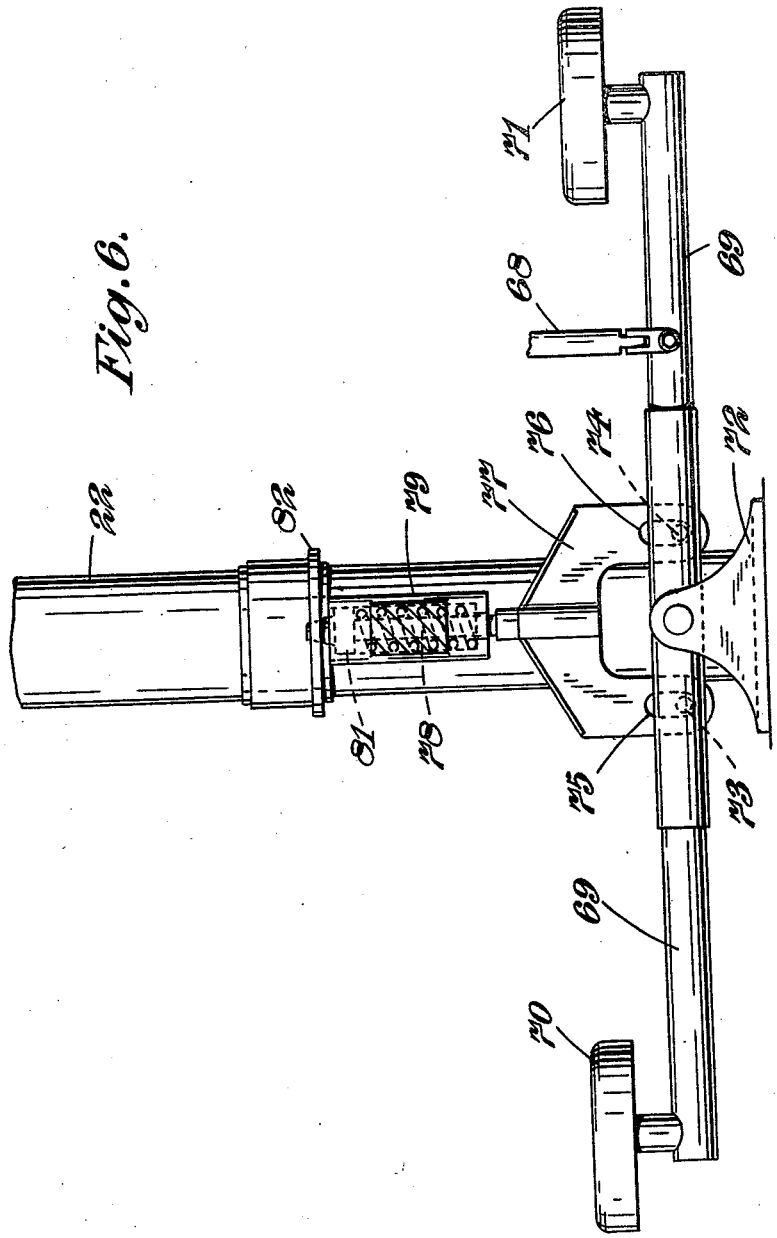

2,254,678

UNITED STATES PATENT OFFICE 2,254,678

GUN TURRET FOR AIRCRAFT

Leslie George Frise, Bristol, England, assignor to The Bristol Aeroplane Company Limited, Bristol, England, a British company Application July 11, 1939, Serial No. 283,905
In Great Britain February 5, 1936

4 Claims. (Cl. 89—37.5)

This application corresponds to the secret patents of The Bristol Aeroplane Company Limited and Leslie George Frise, Serial No. 3539/36 and No. 27440/36 which were filed in Great Britain on February 5, 1936, and October 9, 1936, respectively.

This invention is for improvements in gun-turrets for aircraft and has for its object to enable the gunner to control the gun over a wide range of movement in a simple manner.

According to the invention there is provided a gun-turret, for aircraft, of the kind which is rotatably mounted about a substantially vertical axis and which comprises a gun capable of rotation about a substantially vertical training axis independently of its rotation with the turret, in which the independent rotation of the gun about said training axis is effected by power-actuated means. The power-actuated means is preferably a double-acting hydraulic motor of the reciprocating type, herein referred to as a "jack," operative between a part of the gun-turret and an offset lever on a vertical gun-carrying pillar.

Figure 1:
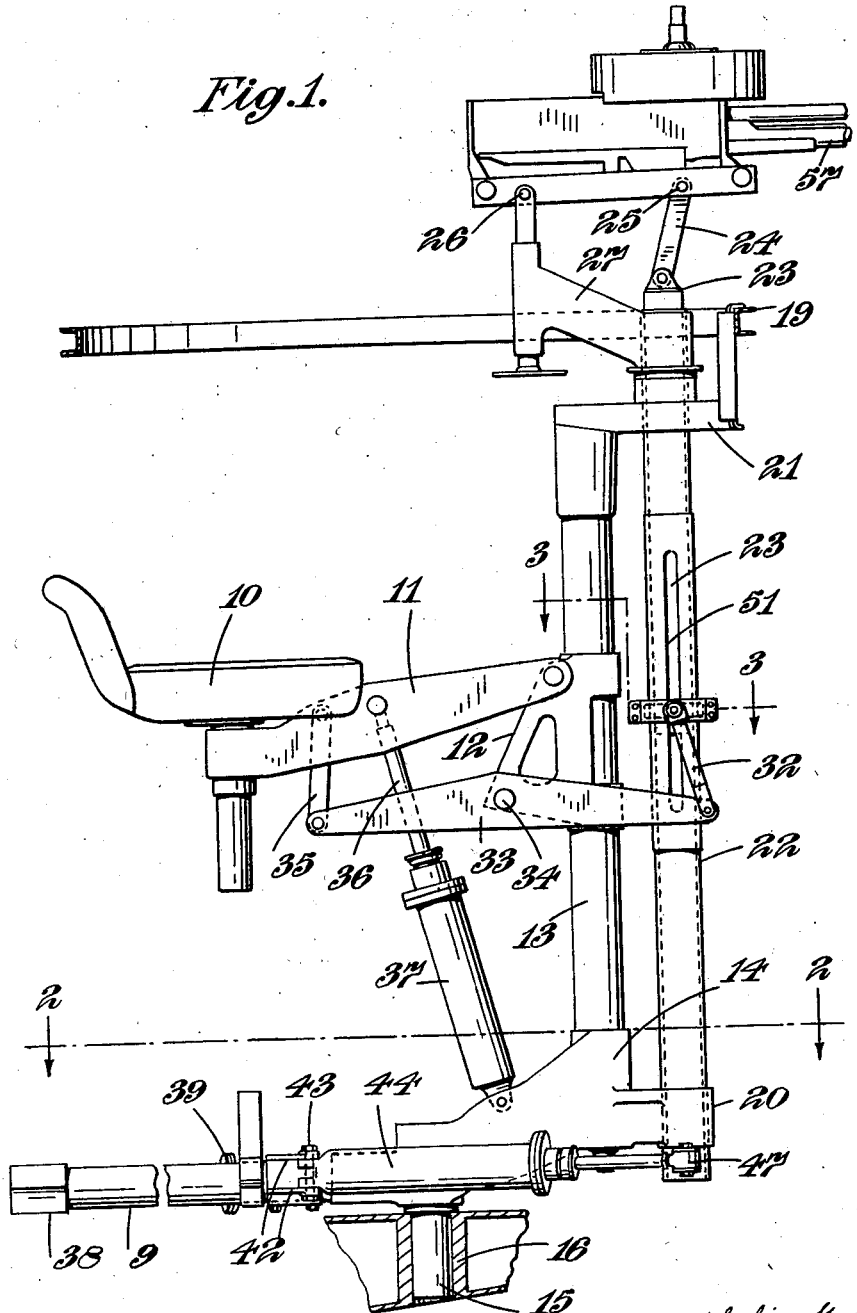
Figure 2:
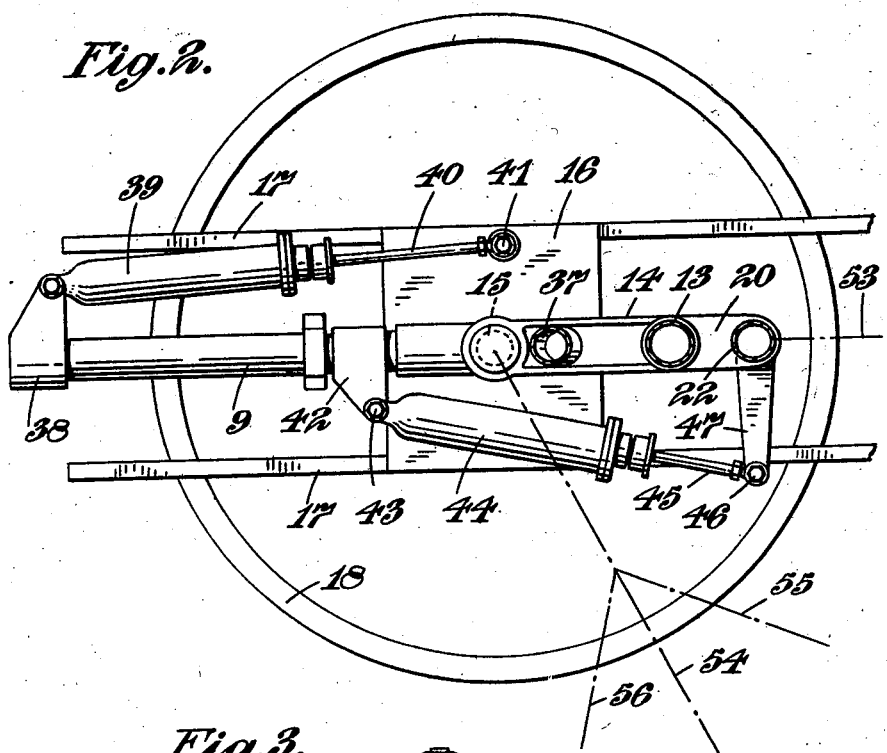
Figure 3:
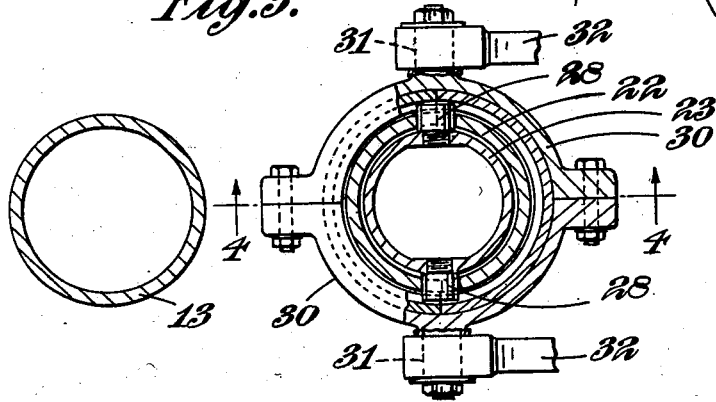
Figure 4:
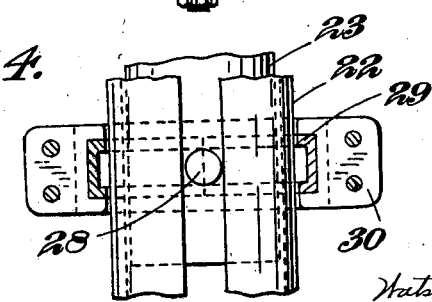
Figure 5:
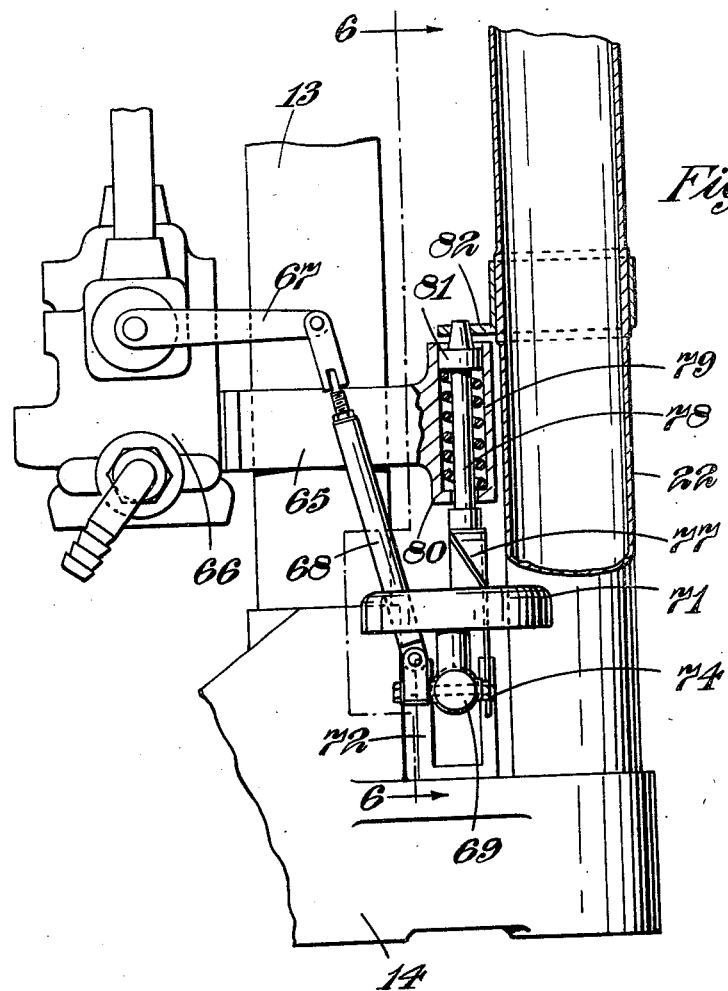

A specific embodiment of the invention will now be described by way of example with reference to the accompanying drawings in which:

Figure 1 is an elevation of the interior of a gun-turret, with certain parts omitted, Figure 2 is a plan on the line 2—2 of Figure 1, Figure 3 is a sectional plan to an enlarged scale on the line 3—3 of Figure 1, Figure 4 is an elevation on the line 4—4 of Figure 3, Figure 5 is an elevation, to an enlarged scale, showing the arrangement of parts at the bottom of Figure 1, and Figure 6 is a view on the line 6—6 of Figure 5.

As shown in Figures 1 and 2, a seat 10 for the gunner is supported by a beam or beams 11 from a bracket 12 carried on a vertical seat-carrying pillar 13. The pillar 13 is supported by a bracket 14 from a horizontal tube 9 having a downwardly directed stub-axle 15 which makes bearing engagement with a frame 16 connected by horizontal members 17 to a fixed part 18 of the aircraft structure. The turret rotates about the vertical axis of the stub-axle 15, the pillar 13 being offset with respect to this axis and rotatable around it.

The seat-carrying pillar 13 also carries at its upper end a ring 19 which is mounted in bearings in a fixed part (not shown) of the aircraft structure so as to be rotatable therein. At the foot of the pillar 13 the bracket 14 is formed with an offset lug 20 which, together with an arm 21 at the top of the pillar 13, provides a bearing for a rotatable vertical shaft 22. Slidable within the shaft 22 is an actuating tube 23 of which the upper end is pivoted to a link 24 pivoted to the gun 57 at 25. The gun is also supported at a rear pivot 26 formed on an arm 27 extending inwardly from the upper end of the shaft 22.

As shown in Figures 3 and 4, the actuating tube 23 is formed at a point about half-way down with radially extending pins 28 which engage the internal groove in a split ring 29 of U-shaped section. The two parts of the ring 29 are held together by a clamp 30 and are provided with diametrically-opposed radial pins 31 each of which is engaged by a link 32. As shown in Figure 1, each link 32 is pivoted to the end of a beam 33 which is pivoted at 34 to the seat-carrying bracket 12. At their other ends the beams 33 are together pivoted to a link 35, the upper end of which is pivoted to the beam 11. Also connected to the beam 11 is the piston rod 36 of a hydraulic jack, the cylinder 37 of which is pivoted to the bracket 14.

The horizontal tube 9 carries at one end a collar 38 to which is connected the cylinder 39 of a hydraulic jack, the rod 40 of which is anchored at 41 to the fixed frame member 16. Another collar 42 carried by the tube 9 forms the anchorage at 43 for the cylinder 44 of another hydraulic jack of which the piston rod 45 is pivoted at 46 to a transverse arm 47 carried at the bottom of the tubular shaft 22. The gun is thus supported through the bracket 27 and beam 33 by the pillar 13.

Elevating movements of the gun are effected by the jack 36, 37. By reason of the interlinkage of the seat 10 with the actuating tube 23 downward movements of the seat produce upward movements of the tube 23 whereby the gun is elevated, being rotated about the pivot 26, when the seat moves down, and depressed when the seat moves up. The seat is thus appropriately adjusted for each different elevation of the gun. The particular form of connection described between the links 32 and the tube 23 permits the shaft 22 to rotate about its own axis independently of the rest of the gun-turret, in a manner described below, without imparting such rotation to the clamp 30, the relative rotational movement taking place between the ring 29 and the pins 28. Longitudinal movement of the pins 28 with respect to the shaft 22 is, however, permitted by the provision of vertical slots 51 in the shaft 22.

Training movements of the gun are effected in two different ways: (1) the gun-turret, pillar 13, seat 10 and gun 57 may be rotated as a whole about the axis of the pin 15 by controlling a valve which admits oil under pressure to one side or other of the piston in the hydraulic cylinder 39; (2) the gun may be rotated independently about the axis of the shaft 22 by admitting oil under pressure to one side or other of the piston in the hydraulic cylinder 44. Preferably the range of movement of the gun-turret as a whole is about 60° on either side of the mean line 53 in Figure 2, that is to say, the gun may be trained to the position 54 by actuation of the jack 39 alone or, of course, a similar angle the other side of the mean line 53. Independent rotation of the gun by means of the jack 44 preferably provides for a range of angular movement of from 30-40° on either side of the axis of the tube 9. Two extreme positions for independent rotation of the gun are shown by the lines 55 and 56 in Figure 2.

The independent rotation above referred to is controlled by the mechanism shown in Figures 5 and 6. The pillar 13 carries a bracket 65 supporting a hydraulic valve 66 which controls the supply of pressure liquid to and from the cylinder 44. The operating arm 67 of the valve is connected by a link 68 to a "rudder-bar" 69 having a pedal 70, 71, at each end.

The rudder-bar 69 is pivoted in a bracket 72 carried by the bracket 14 and is formed with two protruding pegs 73, 74, which engage oblong slots 75, 76 (Figure 6) in a plate-member 77. The member 77 is connected at its upper end to a plunger 78 which is slidable in a tube 79 forming part of the bracket 65. The plunger is spring-pressed upwardly by a compression spring 80 between the bottom of the tube 79 and a flange 81 on the plunger.

The upper end of the plunger is tapered as shown to engage with one of a series of holes formed in a quadrant 82 carried by the shaft 22.

The gunner trains the gun by depressing either the pedal 70 or the pedal 71. Assuming that the pedal 70 is depressed, the pin 73 engages the bottom of the slot 75 whereby the plate 77 moves down and draws the plunger out of the hole in the quadrant; meanwhile the pin 74 rises idly in the slot 76. The shaft 22 is therefore free to rotate. When the "rudder-bar" is restored to its horizontal position the plunger reengages a hole in the quadrant whereby the shaft 22 is locked against movement. Depression of the pedal 71 produces similar movement of the parts. Thus the shaft 22, and therefore the gun, are locked against independent training movement except when the valve 66 is operated.

The invention enables a much more precise training of the gun to be obtained than is possible, for example, with known constructions of gun-turret and provides a large angle of fire and general facility of control.

I claim:

1. A gun-turret adapted to be mounted in an aircraft so as to be rotatable with respect thereto about a substantially vertical axis, a gun carried by the turret and rotatable about a substantially vertical axis independently of its movement with the turret, a hydraulic jack connected between the turret and the gun to effect such independent rotation, a pedal operable by the feet of the gunner to control the said hydraulic jack, means for locking the gun against said independent rotation and means actuated by the said pedal to release the said locking means so that the gun is free to perform its movement of independent rotation only when the said pedal is operated.

2. A gun-turret for aircraft, comprising a vertical pillar, a seat supported by the pillar, bearings carried by said pillar, a vertical shaft rotatable in said bearings, a gun supported on said vertical shaft, means interconnecting said gun and said seat, an elevating jack connected in common to the seat and gun so as to effect adjusting movements to the seat in accordance with elevational movements of the gun, an offset lug on said shaft, and a hydraulic jack connected between the turret and the said lug to effect training movements of the gun with respect to the turret.

3. A gun-turret for aircraft, mounted for rotation about a vertical axis and comprising a pillar offset from and rotatable in an orbit about said axis, bearings carried by said pillar, a hollow vertical shaft rotatably mounted in said bearings, a gun supported on said shaft, a vertically movable member slidable in said shaft and rotatable therewith, means operatively connecting said last member to said gun, means for rotating said turret, means for rotating said shaft on its own axis for training said gun relative to said turret, and means for actuating said vertically movable member to effect elevating movements of said gun.

4. A gun-turret for aircraft, mounted for rotation about a vertical axis and comprising a pillar offset from and rotatable in an orbit about said axis, a vertically movable seat supported by said pillar, bearings carried by said pillar, a hollow vertical shaft rotatably mounted in said bearings, a gun supported on said shaft, a vertically movable member associated with said shaft and rotatable therewith, means operatively connecting said last member to said gun, means for rotating said turret, means for rotating said shaft on its own axis for training said gun relative to said turret, and means for actuating said vertically movable member, means for operatively connecting said seat to said vertically movable member whereby simultaneous elevational movements of said gun and said seat may be effected.

LESLIE GEORGE FRISE.